United States Patent
Ballette et al.

(10) Patent No.: US 8,214,489 B2
(45) Date of Patent: Jul. 3, 2012

(54) PEER TO PEER NETWORK

(75) Inventors: Marco Ballette, Cagliari (IT); Max Gasparroni, Swindon (GB); Patrick Brick, London (GB)

(73) Assignee: Vodafone Group PLC, Newbury, Berkshire (GB)

( * ) Notice: Subject to any disclaimer, the term of this patent is extended or adjusted under 35 U.S.C. 154(b) by 0 days.

(21) Appl. No.: 12/520,525

(22) PCT Filed: Dec. 21, 2007

(86) PCT No.: PCT/EP2007/064499
§ 371 (c)(1),
(2), (4) Date: Oct. 15, 2009

(87) PCT Pub. No.: WO2008/074888
PCT Pub. Date: Jun. 26, 2008

(65) Prior Publication Data
US 2010/0049846 A1 Feb. 25, 2010

(30) Foreign Application Priority Data
Dec. 21, 2006 (GB) .................... 0625665.5

(51) Int. Cl.
*G06F 15/173* (2006.01)
*G06F 15/16* (2006.01)
(52) U.S. Cl. .................... 709/224; 709/207
(58) Field of Classification Search .......... 709/224, 709/203, 207
See application file for complete search history.

(56) References Cited

U.S. PATENT DOCUMENTS
6,192,397 B1 * 2/2001 Thompson .................... 709/209
(Continued)

FOREIGN PATENT DOCUMENTS
EP 1 657 939 5/2006

OTHER PUBLICATIONS

Erkki Harjula, Jussi Ala-Kurikka: "Analysis of Peer-to-Peer SIP in a Distributed Mobile Middleware System," [Online], Aug. 31, 2006, pp. 1-6, XP002485868, University Oulu, Finland, Retrieved from the Internet: URL:http://www.mediateam.oulu.fi/publications/pdf/814.pdf> [retrieved on Jun. 25, 2008].

Yang B et al: "Designing a super-peer network," Proceedings 19th International Conference on Data Engineering (ICDE'2003), Bangalore, India, Mar. 5-8, 2003, [International Conference on Data Engineering (ICDE)], New York, NY: IEEE, US, vol. Conf. 19, Mar. 5, 2003, pp. 49-60, XP010678728.

*Primary Examiner* — Minh-Chau Nguyen
(74) *Attorney, Agent, or Firm* — Workman Nydegger

(57) ABSTRACT

Peer-to-peer networks employing simple peers and super peers strike a balance between centralized (client-server based) and entirely flat peer-to-peer approaches. They introduce hierarchy into peer-to-peer networks in the form of super peer nodes, peers which have extra capabilities and duties in the network. There are problems in the identification and election of peers to take the role of super peer: in particular, the need for regular update messages to communicate peer availability across the network significantly impacts discovery times (when a simple peer attempts to advertise a service or requests a service from another peer). A presence server is implemented in the network in order to monitor the availability of each peer. A device called the "super peer elector" subscribes to receive updated availability information from the presence server and assigns super peer status to the most appropriate, and available, simple peer.

17 Claims, 5 Drawing Sheets

U.S. PATENT DOCUMENTS

| | | | |
|---|---|---|---|
| 7,321,928 B2 * | 1/2008 | Feltin et al. | 709/223 |
| 7,656,836 B2 * | 2/2010 | Baker et al. | 370/328 |
| 7,734,710 B2 * | 6/2010 | Seligmann et al. | 709/207 |
| 7,840,681 B2 * | 11/2010 | Acharya et al. | 709/227 |
| 2002/0161844 A1 * | 10/2002 | Overtoom | 709/208 |
| 2003/0126199 A1 * | 7/2003 | Kadri et al. | 709/203 |
| 2007/0239866 A1 * | 10/2007 | Cox et al. | 709/224 |
| 2008/0019291 A1 * | 1/2008 | Sienel et al. | 370/258 |
| 2008/0133644 A1 * | 6/2008 | Garcia-Martin et al. | 709/202 |
| 2008/0140768 A1 * | 6/2008 | Le Merrer et al. | 709/203 |

* cited by examiner

PEER TO PEER NETWORK

The present invention relates to a method of monitoring the availability of peer nodes in a peer-to-peer network. In particular, the method facilitates monitoring of node availability in unstructured peer-to-peer networks using certain peers as servers ("super peers") with a view to identifying peers which are new super peer candidates.

A peer-to-peer network can be made more efficient by introducing the concepts of super peers and simple peers (also referred to as "edge peers" in the literature). Examples of this type of network include JXTA and Kazaa. A practical application of super peer networks is described in UK published patent application GB2420257. Here, as elsewhere in this specification, the terminology used to describe elements of super networks follows the convention adopted in GB2420257.

Peer-to-peer networks employing simple and super peers strike a balance between centralized and entirely flat peer-to-peer approaches. They introduce hierarchy into peer-to-peer networks in the form of super peer nodes, peers which have extra capabilities and duties in the network. The additional capabilities of super peer nodes include: the ability to store information about the contents/services (herein referred to as "published advertisements") offered by the simple peers they serve (herein referred to as "content providers"); and the ability to provide requesting peers with a list of those content providers that are willing to share contents/services matching the data provided in the requesting peers' request (herein referred to as "search advertisements").

One limitation of the hybrid super peers system (such as that described in GB2420257) is the operation of mechanisms for electing super peers. Such systems rely on the presence of a server (herein referred to as a "bootstrap server") in order re-direct peers to their assigned super peer(s) when entities appear in the network with no previous knowledge of any of the available super peers' location.

In such systems, simple peers send periodic "keep-alive" messages to their assigned super peer. Analogously, super peers send further "keep-alive" messages of their own to the bootstrap server. This information is needed in order for the bootstrap server to have up-to-date information on the availability of each super peer. Super peers should in fact be constantly available in order to perform their lookup functionalities efficiently in response to the queries of simple peers.

Particular difficulties are presented when super peers frequently disconnect. When this happens there is a substantial increase in the number of signal sent between peers in the network. This signalling increment highlights the importance of selecting super peers based on their expected availability. Disconnection of a super peer results in a large amount of signalling messages, due to the need to propagate up-to-date information about the available super peers in the network. This signalling overhead could be avoided by electing more stable devices as super peers.

It is therefore an object of the invention to obviate or at least mitigate the aforementioned problems.

In accordance with one aspect of the present invention, there is provided a method for performing the election of super peers in a peer-to-peer network, the peer-to-peer network including at least one simple peer node and at least one super peer node, the method comprising: providing at least one presence server for receiving presence messages from nodes within the network; at the presence server, maintaining a presence list in accordance with the presence messages received within a predetermined period; the or each super peer node sending a periodic presence message to the presence server to indicate continuing availability as a super peer node; determining which simple peer nodes are available to perform super peer functions; and electing one of the available simple peer nodes as a new super peer node using the most recent presence list to confirm availability.

The peer-to-peer network of the invention is thus a 'hierarchical' peer-to-peer network employing servers, super peers and simple peers. The method, when operating on a centralised super peer elector server, ensures that the number of messages which are transmitted over the network as a result of changes to the number and/or capabilities of super peers can be significantly reduced relative to conventional peer-to-peer networks having no presence service.

In accordance with another aspect of the present invention, there is provided a peer-to-peer network including: a plurality of devices, each device having a respective unique address for enabling messages to be delivered thereto, wherein the devices include at least one publishing device that provides services for use by devices in the network and at least one searching device that uses services provided by devices in the network, some of the devices being adapted to function as super peer nodes, each super peer node being capable of: storing advertisements for services provided by publishing devices and a respective address indicative of the publishing device providing the service; receiving requests for services from searching devices; and providing searching devices with respective addresses associated with the services; a presence server for receiving presence messages from each device in the network and maintaining a presence list in accordance with the presence messages; and a super peer elector which subscribes to receive the presence list from the presence server and processes the presence list to determine whether a new super peer node is required in the network, wherein the super peer elector further uses information from the presence list to determine which simple peer nodes are available to perform super peer functions and elects one of the available simple peer nodes as a new super peer node using the most recent presence list to confirm availability.

In such a peer-to-peer network, receipt of an advertisement from a new device not currently attached to the network can also be addressed. The most recent presence list is consulted and the new device is directed to attach to a super peer node indicated to be present, thereby facilitating a peer-to-peer communication session between devices while efficiently identifying available super peer nodes.

For a better understanding of the present invention, reference will now be made, by way of example only, to the accompanying drawings in which.

Figure 1:
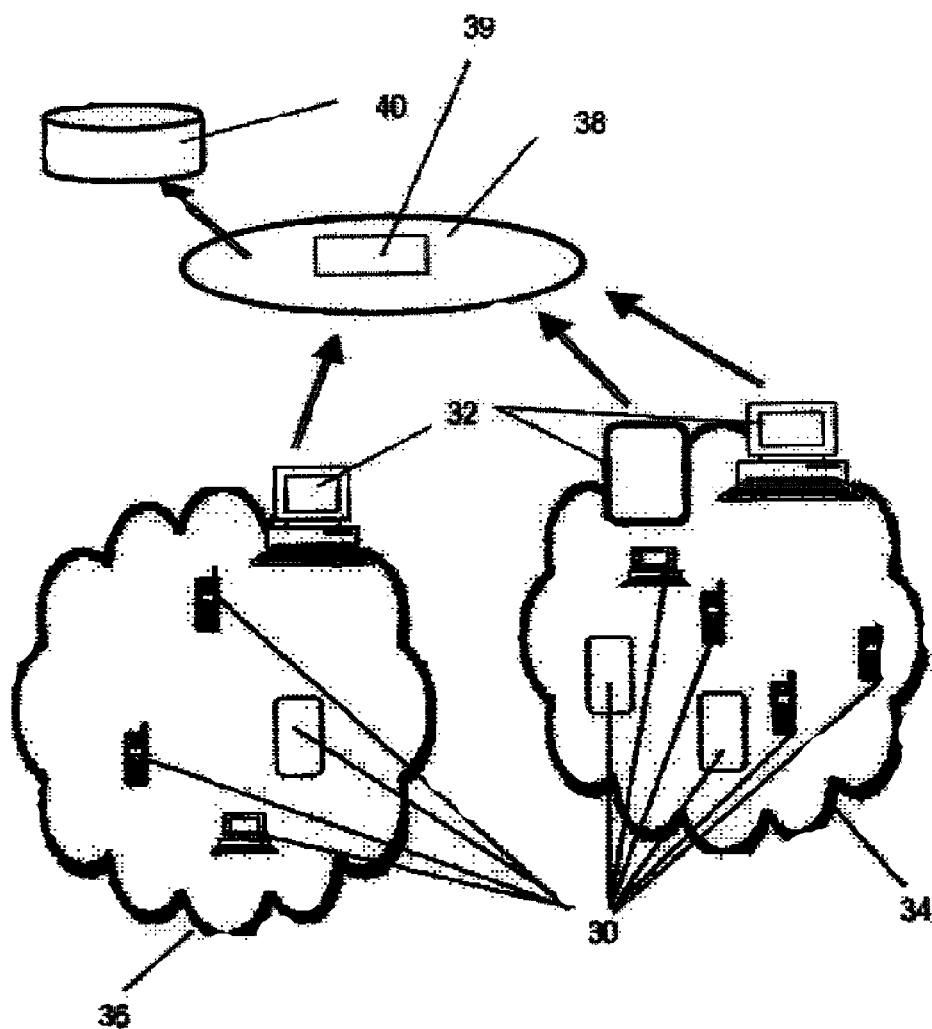
FIG. 1 illustrates a conventional, hierarchical super peer network.

A peer-to-peer network can be made more efficient by introducing the concept of simple peers and super peers. One implementation of a super peer network is described in the applicant's co-pending UK patent application, GB 0425261.5, published as GB2420257.

Peer-to-peer systems like KaZaA, Gnutella, JXTA and the applicant's own PeerMob have adopted the super peer approach in their design. Each of these systems shares the important feature that super peers are required to be capable of providing any peers that contact them with some information about the group of peers they have charge of.

In their article, *Designing a super-peer network* [Proceedings of the ICDE, March 2003] the authors (B. Yang and H. Garcia-Molina), have written an informative introduction to the subject of super peer networks.

The present invention, in one aspect, concerns the facilitation of distribution of information in a network, and in particular seeks to enable efficient peer-to-peer communication between terminals. The bearer network and associated protocol(s) by which these terminals are connected to one another are not of particular relevance to the present invention (although certain embodiments do provide particular advantages when some or all of the terminals are linked via a non-fixed link, such as a mobile or cellular telecommunications network). The type of connection between the terminals is not specified in the following discussion for the sake of simplicity. The "network" connecting the terminals may of course comprise a multiplicity of different networks including mobile telecommunications networks, wide area fixed communication networks (i.e. the internet) and/or leased line networks.

Particular difficulties with combining wireless terminals in a network that allows peer-to-peer communication between terminals include:

1. Connectivity of a given wireless terminal may be lost (for example, because it moves out of the area of coverage of its cellular network).

2. "Handover": The access point and/or access network of the terminal may change, resulting in the IP address of the terminal charging.

3. Generally, mobile terminals have limited resources such as memory, CPU speed and battery power. These resources need to be used efficiently.

4. The available bandwidth for data communication is to be smaller than available in fixed networks.

JXTA (mentioned above) is a set of open, generalized peer-to-peer protocols that allow any connected device on a network, such as cellular phones, PDAs, laptops and computers, to communicate and collaborate as peers. The basic terminology of JXTA is as follows:

Peers: any networked devices that implement the JXTA core protocols. Each peer is identified by a unique ID. Peers are autonomous and operate independently and asynchronously of all other peers, although some peers may depend on other peers as relays.

Pipes: Virtual communication channels used to send and receive messages between services or applications residing on peers. Pipes provide the illusion of virtual in and out connection that is independent of any single peer location network topology.

Peer Groups: collections of peers having a common set of interests. Each peer group is uniquely identified by a peer group ID. There are two main common motivations for creating peer groups. First, peer group boundaries permit only member peers to access and publish protected content and access peer group resources to create a secure environment. Second, peer group boundaries define the search scope when searching for a group's resources, speeding up the discovery process and making it bandwidth efficient.

Advertisements: language-neutral metadata structures which describe all network resources, such as peers, peer groups, pipes and services.

There are two principal types of "Advertisement":

1. "Published advertisement"—this is data describing a service or other information that a peer has or wishes to make available to other peers.

2. "Search advertisement"—this is data identifying information that the peer issuing the search advertisement wishes to receive.

There are various possible types of peer in JXTA. Peers can take on one or more roles, with the role type defining the set of responsibilities of the peers to the JXTA network:

Simple peers: can send and receive messages. They do not cache advertisements; the only information stored may be the location (IP address) of their super peers (discussed immediately below).

Super peers: can send and receive messages, and maintain a cache of advertisements. Furthermore, super peers can also forward discovery requests to help other peers discover resources. Each super peer maintains a list of other known super peers and also the peers that are using it as a super peer.

At the highest abstraction level, the JXTA architecture is divided into three layers:

1. The JXTA core layer includes a set of various protocols specifically designed for peer-to-peer networks. The JXTA core runs on any reliable transfer protocol, such as TCP and HTTP. These protocols are know to those skilled in the art and will not be discussed further here.

2. The middle layer includes: JXTA services which encapsulate JXTA core implementation details to provide unique Application Programming Interfaces (API). JXTA services can be divided into two categories:

Peer Service: functionality offered by a particular peer on the network to other peers. The capabilities of this service are unique to the peer and are available only when the peer is connected to the network.

Peer Group Service: functionality offered by a peer group to the other members of the peer group. The core group services include: discovery service, membership service, access service, resolver service and monitor service.

3. The top layer hosts the user application which builds on the capabilities of the service layer to provide peer-to-peer applications, such as peer-to-peer instant messaging, resource sharing and distributed computing applications.

Where not specified otherwise, the terminology used to describe elements of peer networks is based on the JXTA terminology given above.

A first limitation of known super peer systems concerns the obtaining of published advertisements by issuance of a search advertisement. In the known arrangement the peer issuing the search advertisement must know the object name of the published advertisement that it is seeking. In order to locate the published advertisement there are three discovery techniques:

1. The peer can search the published advertisements stored in its own cache.

2. The peer can search advertisements stored in the caches of other peers that are in the same LAN by broadcast or multicast.

3. If the published advertisement is not available by technique 1 or 2 above, then the peer (if it is not a super peer) will pass the search advertisement to a super peer, which will in turn pass the search advertisement to other super peers of which it has details. These other super peers will be located in a different LAN. These other super peers will also propagate the request to further super peers of which they have details.

This technique is referred to as WAN discovery. Such an approach may require the search advertisement to be propagated through a multiplicity of super peers in a multiplicity of LANs to obtain the desired published advertisement. It is also possible that the peer which does have the requested published advertisement is not known to any of the super peers through which the search advertisement is propagated, and therefore the published advertisement will never be retrieved from that peer.

A second problem with known super peer systems is that there is no mechanism for managing the number of super peers relative to the number of simple peers. As will be explained below, this can be wasteful of resources, can adversely impact the scalability of the system and can result in service not being available due to a lack of the required number of super peers.

A third problem with known super peer systems is that typically a published advertisement will only be available from one peer. This may not be a significant problem when all the peers are connected together by a fixed network. However, if the peer on which the published advertisement is stored is a mobile or cellular device, it may become temporarily unavailable, which will mean that the relevant published advertisement cannot be retrieved.

The present invention may be better understood from the system architecture shown in FIG. 1. Peers (that is simple peers 30 and super peers 32) may be members of one or more groups 34,36. In accordance with an important feature of the architecture, a centralised server 38 is provided for communicating with the peers 30,32 in each of the groups 34,36. The centralised server 38 may be located at any location in the network. For example, the centralised server 38 could be located in a mobile telecommunications network.

Some or all of the peers may be provided with a SIM or simulated SIM, enabling the peer to be authenticated by the mobile telecommunications network. The central server 38 may be configured to only communicate with peers that are so authenticated.

Each peer 30,32 has an IP address. It is possible that the IP address of a peer will change—for example, when the access point that it uses to connect the network changes.

The system supports web services. A web service is a software system designed to support inter-operable device-to-device interaction over a network. Typically, web services have an interface described in a machine-processable format called web service description language (WSDL). This is a standard XML (extensible Markup Language, www.xml.org)-formatted language. Other systems interact with the web service in a manner prescribed by its description using simple object access protocol (SOAP) messages, typically conveyed using HTTP with an XML serialisation in conjunction with other web-related standards. SOAP allows a program to invoke a service through message exchange, regardless of programming languages or underlying network.

The mechanics of the message exchange between devices are documented in a web service description (WSD). The WSD is a machine-processable specification of the web services interface, written in WSDL and stored in the central server in a WSDL directory 39. It defines the message formats, data types, transport protocols and transport serialisation formats that should be used between different devices. The service description represents an agreement governing the mechanics of the interaction between the devices.

Given the foregoing, it is apparent that an arbitrary distribution of super peers in any peer-to-peer network would result in sub-optimal network performance. GB2420257 introduced concepts for implementing so-called "semantic overlay groups" together with data and advertisement replication in the network, to ensure properties such as fault tolerance (system resilience on frequent peers' disconnection from the network), particularly necessary in mobile environments. The properties of semantic overlay groups have also been studied in A. Loser et al., *Semantic overlay clusters within super-peer networks* [Proc. Of the Int. Workshop on Databases, Information Systems and Peer-to-peer Computing in conjunction with the VLDB 2003].

The term semantics when applied to a web service is an expression of shared expectations about the behaviour of devices using the service, and in particular the nature of a response to a message sent to a device. The semantics of a web service can be considered to be an agreement between the devices concerning how and why they will interact. In FIG. 1, a semantic database 40 stores the semantics of each web service.

In the illustrated architecture, the semantic discovery mechanism helps in finding the group to be joined by a peer, based on user preferences and other requirements. A simple example demonstrates the mechanism: consider peer groups interested in house buying.

First, a user interested in joining a certain group buying/selling houses in the embodiment contacts the centralized server 38 expressing their interest in joining that group, for example to sell or buy houses. The centralised server 38 processes this information and checks in its database for the existence of house selling groups.

Groups having similar purposes are termed "interest domains"—i.e. domains can be formed by different groups. For instance, the "house buying/selling" domain may be formed by different groups depending on the post code of the house. What characterises each different domain is the common XML schema used by the groups belonging to the same domain.

In general, a schema is an abstract representation of an object's characteristics and relationship to other objects. An XML schema represents the interrelationship between the attributes and elements of an XML object (for example, a document or a portion of a document). To create a schema for a document, the structure is analysed, defining each structural element.

Different domains have different schemas because they require information that varies with the domain. Elements in the schema are defined within a set of tags, the tags being relevant to the particular domain. For instance, if the user is interested in joining a "music file sharing" domain he will have to specify things such as the type of music in which he is interested, favourite singers, and so forth.

Once the user has expressed their domain preferences and the centralised server 38 has located the appropriate domain, the server 38 sends the schema to the user. The schemas relating to different domains are stored in the semantic database 40.

Super peer nodes operate both as simple peers and as servers to a set of other simple peer nodes, for whom they store (published) content advertisements in order to facilitate scalable and fast content discovery by simple peers wishing to join the peer-to-peer system. Super peers introduce a level of hierarchy in peer-to-peer systems that achieve an optimal balance between the efficiency of centralized search, and the autonomy, load balancing and robustness provided by distributed search. Furthermore, peer-to-peer systems employing super peers take advantage of the heterogeneity of peer capabilities (e.g., bandwidth, processing power), which recent studies have shown to be enormous.

Figure 2:
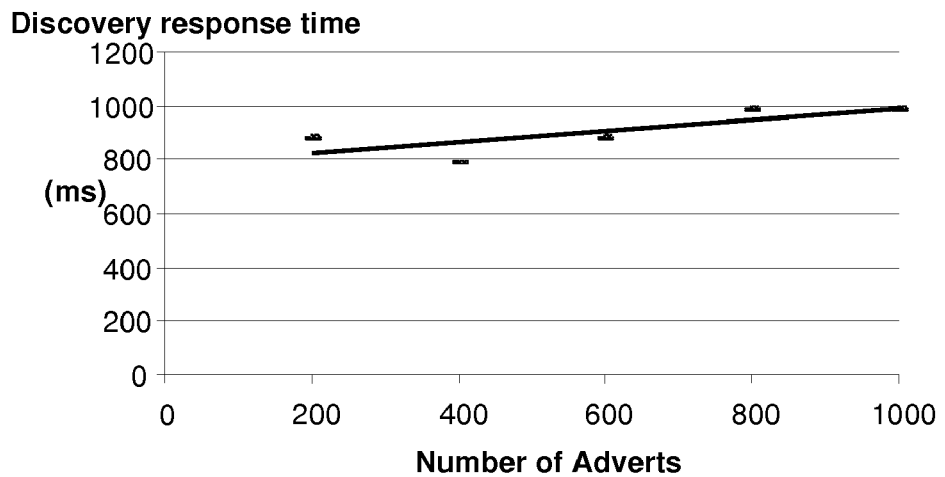
FIG. 2 shows the relationship between super peer discovery time and number of advertisements stored in each super peer.

The number of advertisements stored by each super peer is likely to affect the discovery time by simple peers wishing to join the peer-to-peer system. As illustrated in FIG. 2 for an implementation of the applicant's own PeerMob system, the more adverts there are on each super peer, the longer super peer discovery is going to take.

Figure 3:
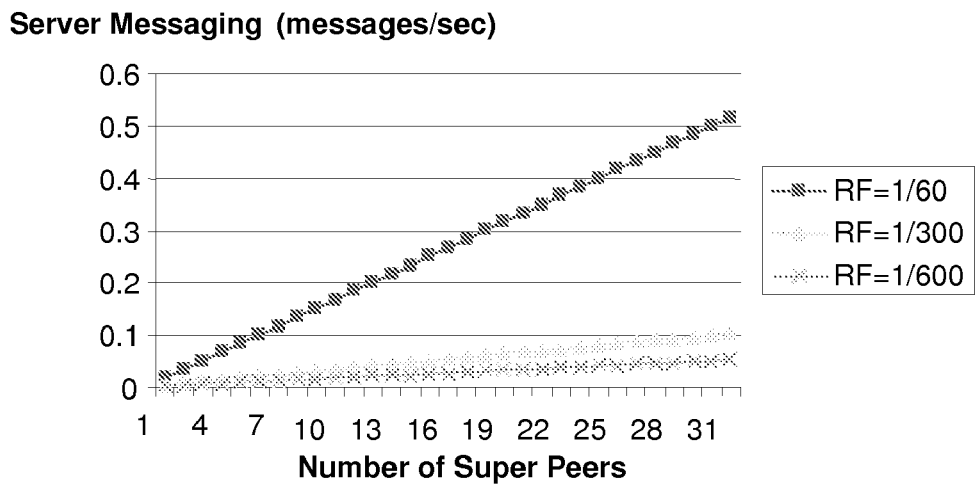
FIG. 3 shows the relationship between the number of signalling messages exchanged between super peers and a centralized server and the number of super peers, for different refresh frequencies (RF)

On the other hand, increasing the number of super peers in the network impacts the number of refresh signalling messages exchanged between the centralised server (entity 38 in FIG. 1) and super peers (entities 32 in FIG. 1). FIG. 3 shows the number of messages per second exchanged between the centralised server and super peers in a PeerMob implementation for various refresh frequency (RF) rates.

Hence the number of super peers in a peer-to-peer network has to be dynamically adjusted with the varying number of advertisements and simple peers to achieve the best compromise between reduced discovery time and increased signalling load towards a centralised entity.

Figure 4:
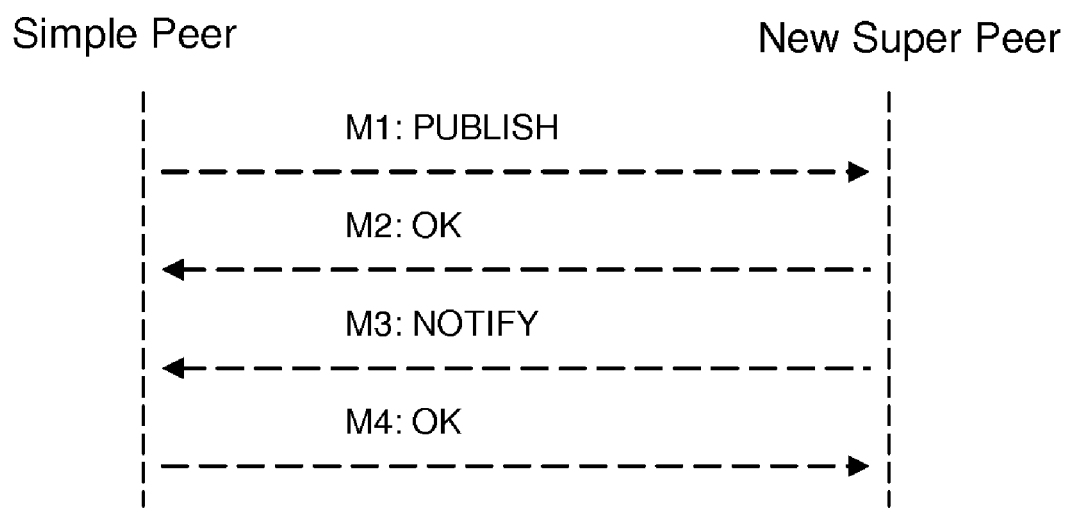
FIG. 4 shows the message flow used by a simple peer to register its advert to a selected super peer.

The importance of electing super peers that are stable is illustrated in FIG. 4. Each simple peer connected to a super peer that has disconnected from the network will have to initiate a four message signalling exchange to register its advertisement to the selected new super peer. Given that a super peer could serve simple peers in numbers of order of thousands, the importance of selecting a stable super peer becomes paramount.

The foregoing applies equally to both fixed and wireless (mobile) networks. Mobile communications bring additional challenges: not least the increased likelihood of disconnecting nodes due to typically lower quality of service, with the consequential increase in signalling. In the future (and partly to address such challenges), converged (fixed and mobile) communications are expected to be implemented in the IMS ("IP Multimedia Subsystem")—an infrastructure architecture standardized by 3GPP.

IMS mandates a core network server architecture that sits behind the GGSN (Gateway GPRS Support Node) in the packet switched domain and specifies a service-centric framework for both wired and wireless networks. The aim of IMS is to allow bodies such as mobile telephone network operators to provide services to their users as efficiently and effectively as possible. IMS provides an open interface for third party services to be easily integrated, providing an opportunity for end users to experience rich and personalized services. The IMS architecture enables both current and future internet services, including instant messaging, video conferencing, and online gaming.

A protocol known as SIP ("Session Initiation Protocol") has been adopted as a 3GPP signalling protocol and forms a mandatory component of the IMS architecture. SIP was developed by Internet Engineering Task Force (IETF) as an application layer protocol for initiating, altering and terminating sessions with one or more participants

[The working documents of the IETF are (publicly available) Internet Drafts and Requests For Comments (RFC). A list of current RFCs relating to SIP is available at: http://www1.cs.columbia.edu/sip/drafts.html: RFC 3261, for instance, describes SIP generally].

The SIP protocol is a session-based protocol designed to establish IP based communication sessions between two or more end points or users. Once a SIP session has been established, communication between these end points or users can be carried out using a variety of different protocols (for example those designed for streaming audio and video). These protocols are defined in the Session Description Protocol (SDP) body of the SIP session initiation messages. It is worth noting that SIP is the control protocol for a range of text and multimedia sessions including VoIP, instant messaging, video, and online games.

Presence (a user's availability for contact) is a service supported by IMS and will therefore be available as widely in next generation mobile (3G and future) telecommunications networks as it is in fixed networks. The presence service deployed in IMS (and implemented in SIP) is critical to many planned services as it provides extensive customized information for both end users and third party services. The presence service also provides the ability to manage the presence information of users and users' devices. A user's presence information may be obtained in a number of ways, for example: through input from the user; information supplied by network entities; or information supplied by elements from the visiting network.

SIP presence services are provided by a general purpose asynchronous event notification framework, described in RFC 3265. The event notification framework is not however intended to be a general-purpose infrastructure for all classes of event subscription and notification, since requirements for the general problem set of subscription and notification are considered too complex for a single protocol.

The framework is instead meant to provide event notification which is sufficient to implement simple features, such as: automatic callback services (based on terminal state events); buddy lists (based on user presence events); and message waiting indications (based on mailbox state change events), yet still flexible enough to be easily extended to provide a variety of services.

The SIP presence service can be considered as a mechanism for using the information provided by presence sources (sometimes referred to as "presentities" in the literature) to subscribers of this information (herein referred as "watchers").

The method of the present invention makes use of presence information originating from presentities for the purpose of electing special entities performing lookup functionality for services and contents in a peer-to-peer network, i.e. super peers. In one embodiment of this method, the presence server complies with the SIP standards outlined above. This embodiment is illustrated in FIG. 5 and discussed below.

An entity 550 in charge of the super peers election (herein referred as "SP elector") subscribes to all the entities 530, 532, 534 in the peer-to-peer network as a consumer of presence information; in this sense the SP elector 550 is a "watcher", according to the SIP standards set out in RFC 3265 and rules defined in RPC 3857. SP electors in this instance subscribe to presence information notification using a SIP SUBSCRIBE method.

Peers (presentities) 530, 532, 534 publish their presence information to a presence server 560 according to the standards defined in RPC 3903 (for instance, using the SIP PUBLISH method). Super peer presence information data is provided to the presence server 560 in the same way. In this instance, this information is provided within the XML body of the SIP PUBLISH method.

Figure 5:
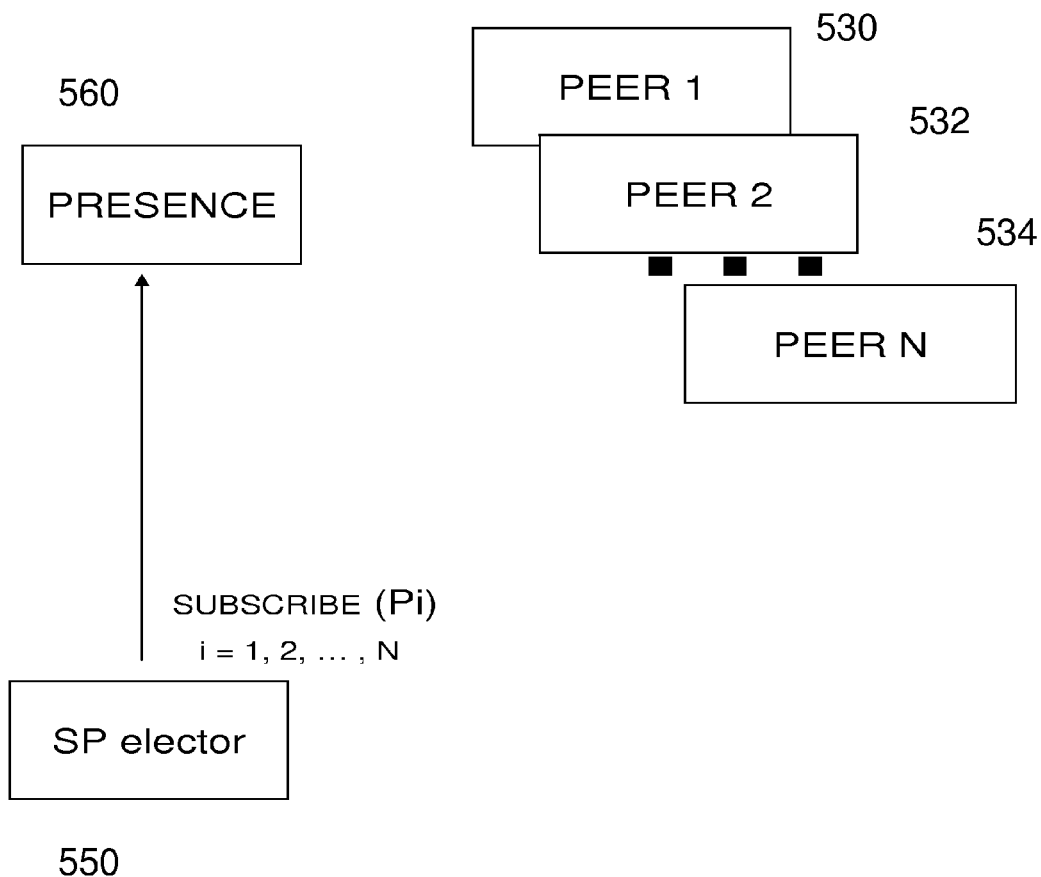
FIG. 5 illustrates the operation of a presence server in accordance with RPC 3265.

Being a watcher of the elements in the super peer network, the SP elector 550 receives notification of the presence status of each subscribed peer via SIP NOTIFY messages sent by the presence server 550, as shown in FIG. 5, and according to the extensions of the event notification template package defined in RPC 3265. In one variant of this method, presence status notification is provided in the XML body of the SIP NOTIFY message. The SP elector 550 collects this information, and periodically updates its records on the presence status of each peer (see FIG. 5).

Figure 6:
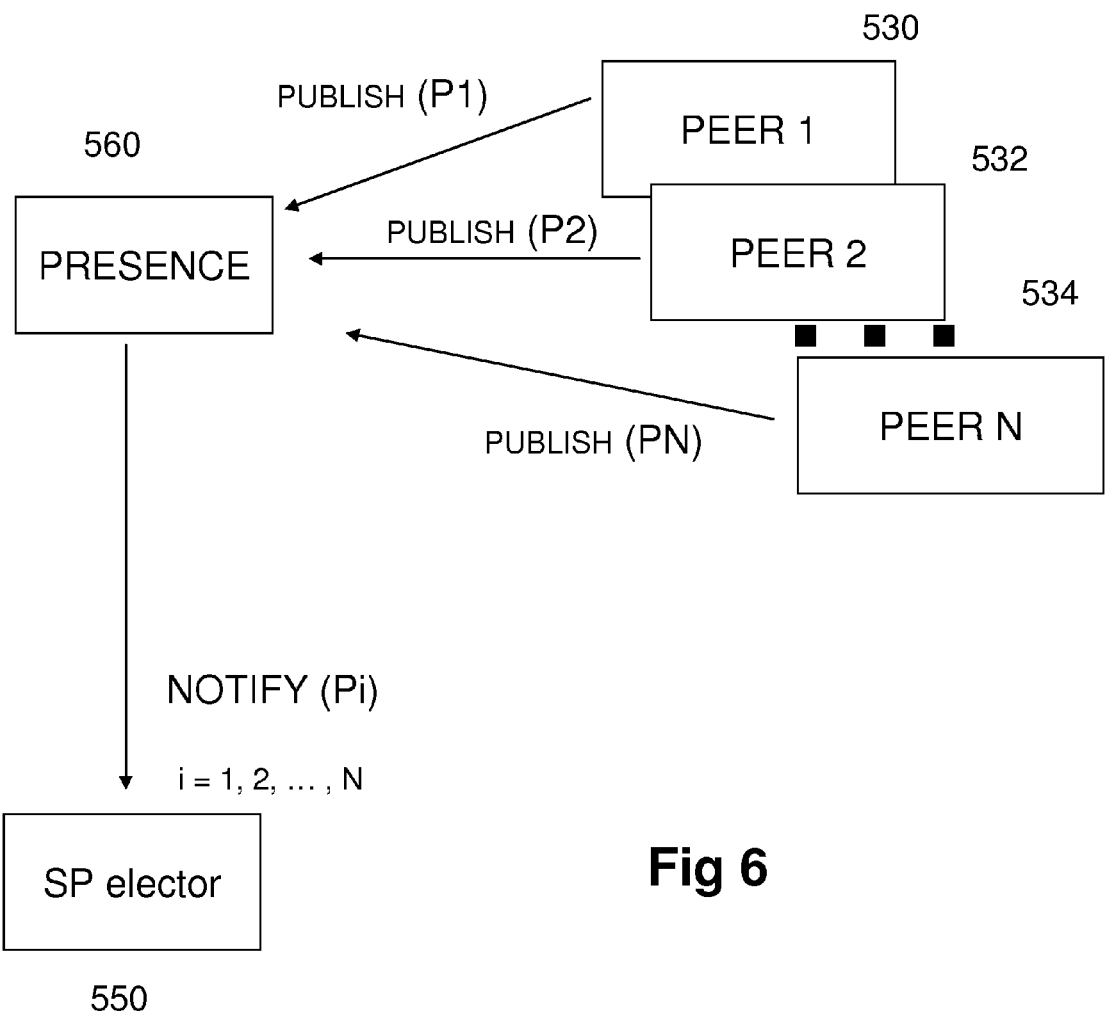
FIG. 6 shows a super peer network having an associated presence server in accordance with an aspect of the invention.

Whenever an external event (e.g. existing super peer leaving the network) triggers the super peer election event, the SP elector 550 elects the new super peer from amongst the N simple peer candidates 530,532,534. This decision is based on the presence information collected from the presence server 560, comparing the single peers' presence information function f(Pi) shown in FIG. 6, collected prior to the election.

Presence information can thus perform the election of super peers in a 'hierarchical' peer-to-peer network employing simple peers and super peers.

In a further aspect of the invention, additional information may be obtained for use in super peer election. In particular, information on peers' capabilities and resource usage may be gathered. This has practical benefits: a PDA that is running out of battery will not represent a suitable candidate for performing super peer functionality. Likewise, a terminal with a very limited bandwidth will not be able to reply effectively to a great number of queries sent by requesting peers.

The current standard for describing presence in a SIP-enabled network is Presence Information Data Format (PIDF), as defined in RFC 3863 by the IETF Instant Messaging and Presence Protocol Working Group (IMPP). PIDF is an extensible data format, in fact an implementation of extensible Markup Language, XML.

To obtain additional information useful in super peer election, the current standard for describing presence in a SIP-enabled network is extended to include fields for the description of additional capabilities such as bandwidth or storage of those terminals participating in a peer-to-peer network for the purpose of (but not necessarily limited to) content and/or service sharing.

To understand where PIDF sits within the SIP architecture, it is instructive to refer to a number of other SIP-related RFCs. In RFC 3860, the author, J. Peterson, describes the Common Profiles for Instant Messaging (CPIM) and Presence (CPP) specifications, which in turn define a set of operations and parameters to achieve interoperability between different Instant Messaging and Presence protocols which meet Instant Messaging/Presence Protocol Requirements [RFC 2779].

RFC 3863 defines PIDF as a common presence data format for CPP-compliant [RFC 3860] presence protocols, allowing presence information to be transferred across CPP-compliant domain boundaries without modification.

RFC 3863 also defines an extensible framework and a minimal set of presence status values specified by the IMPP Model document [RFC 2778].

A "presence payload" in the XML-encoded PIDF is expected to be produced by the presentities and transported to the watchers by the presence servers or gateways without any interpretation or modification.

Presence information includes any type of document sent in the XML body of a NOTIFY SIP message and conforming to the common presence data format for CPP-compliant presence protocols. With the extensions to PIDF, this information further includes, but is not limited to information on: processing capability, network capability, storage capability, battery status, availability and usage for each peer, and availability to perform super peer functionalities in the network.

The aforementioned extensions to the PIDF, may include (but are not limited to) any type of information on the future availability of terminals, and particularly their availability to perform functionality related to content or service sharing in peer-to-peer networks. This can be used by the SP elector to prevent the election of peers that are expected to not be available in the future.

As previously discussed, the SIP event notification framework described in RFC 3265 was devised to process signalling between end users (for example, the provision of messaging services such as VoIP (voice over internet protocol) and IM (instant messaging)): the assumption being that the "presence" of a device indicated the availability of a human operator. It was certainly never contemplated that a SIP presence server system could be adapted to perform super peer selection in super peer networks.

Clearly a facility for gathering such additional information is useful when a super peer election event is triggered. The decision about which of the simple peers should be assigned super peer status will be better informed as to the current capabilities of each peer.

Several approaches have been proposed concerning the usage of peer-to-peer networks for SIP-based IP telephony, but none have ever proposed the adaptation of the presence service in SIP as a mechanism for determining availability in the peer-to-peer network.

Previous proposals can be classified into two categories: 1) SIP services that use peer-to-peer architectures, where the decentralized peer-to-peer paradigm is used to implement SIP-based location services; and 2) peer-to-peer systems using SIP, where SIP messages are used to transport peer-to-peer traffic.

Consider the first category: the SIP community has recently embraced the peer-to-peer communication framework where decentralized discovery and management functionality are the main goals that will redefine the concept of SIP. This contrasts with the traditional SIP approach, herein referred to as "Conventional SIP" or "Client/Server SIP", which assumes a relatively fixed hierarchy of SIP routing proxies (servers) and SIP user agents (clients). According to "Conventional SIP" location process, the host part of the URI indicates either the target SIP user agent (UA), or a proxy that has knowledge of how to reach the target UA, presumably gained through SIP's registration process.

This first category of services form an alternative approach which solves the discovery problem in a serverless environment, reducing the amount of configuration and administration required. Detailed examples may be found at http://www.p2psip.org/.

The second category of proposed services, i.e. "peer-to-peer using SIP" services, seek to demonstrate the viability of SIP as a protocol over which peer-to-peer (peer-to-peer) applications may be implemented. One example, Earthlink [http://www.research.earthlink.net/p2p/], describes a peer-to-peer system based on SIP for peers' registration and exchange of information to establish peer-to-peer sessions.

Extensions to the SIP-events framework of RPC 3265 and publication mechanisms introduced in RPC 3903 have been proposed to enable "peer-to-peer using SIP" services. In one case, RFC 4480, user agents (i.e. applications running on a terminal) use the SIP event framework to publish, subscribe and receive notifications of the availability of generic resources, where a "resource" is a term encompassing, amongst other things: image files, video files, audio files, streaming content, printers and individual printer jobs.

Notably, none of many existing approaches (either "SIP using peer-to-peer" or "peer-to-peer using SIP") deal with the use of presence information for the purpose of super peers' election.

The invention claimed is:

1. A method for performing the election of super peers in a peer-to-peer network, the peer-to-peer network including at least one simple peer node and at least one super peer node, the method comprising:

providing at least one presence server for receiving presence messages from nodes within the network;

at the presence server, maintaining a presence list in accordance with the presence messages received within a predetermined period, wherein the presence list is periodically updated based on the presence messages received within the predetermined period;

the or each super peer node sending a periodic presence message to the presence server to indicate continuing availability as a super peer node;

determining which simple peer nodes are available to perform super peer functions; and electing one of the available simple peer nodes as a new super peer node using the most recently updated presence list to confirm availability.

2. The method as claimed in claim 1, wherein the peer-to-peer network uses a Session Initiation (SIP) event notification framework to monitor peer node presence.

3. The method as claimed in claim 2, wherein the presence messages received by the presence server are SIP PUBLISH messages.

4. The method as claimed in claim 3, wherein each SIP PUBLISH message is formatted in XML and includes presence information data in the XML body.

5. The method as claimed in claim 1, wherein the step of determining the availability of a given simple peer node includes:

subscribing to receive presence information notifications from the presence server, the most recent presence information notification being representative of the respective availabilities of all nodes within the network.

6. The method as claimed in claim 5, wherein presence information notifications are received as SIP NOTIFY messages from the presence server.

7. The method as claimed in claim 6, wherein each SIP NOTIFY message is formatted in XML and includes presence information data in the XML body.

8. The method as claimed in claim 5, wherein a SIP SUBSCRIBE method is used to subscribe to receive presence information notification.

9. The method as claimed in claim 1, wherein the periodic presence messages further include peer status information including at least one of:

peer bandwidth availability, peer storage capability and peer resource usage, and wherein the step of determining which simple peer nodes are available to perform super peer functions includes evaluating the peer status information for at least one simple peer node to determine whether the at least one simple peer node is capable of handling performance of super peer functions.

10. The method as claimed in claim 9, wherein the peer status information is transmitted within extended PIDF (Presence Information Data Format) fields.

11. The method as claimed in claim 9, wherein the peer status information further includes an indication of expected future availability of the transmitting peer node for the purpose of content and/or service sharing.

12. The method as claimed in claim 1, wherein at least one of the simple peer nodes is a mobile telecommunications device.

13. A peer-to-peer network including:

a plurality of devices, each device having a respective unique address for enabling messages to be delivered thereto, wherein the devices include at least one publishing device that provides services for use by devices in the network and at least one searching device that uses services provided by devices in the network, some of the devices being adapted to function as super peer nodes, each super peer node being capable of:

storing advertisements for services provided by publishing devices and a respective address indicative of the publishing device providing the service;

receiving requests for services from searching devices; and providing searching devices with respective addresses associated with the services;

a presence server for receiving presence messages from each device in the network and maintaining a presence list in accordance with the presence messages; and a super peer elector which subscribes to receive the presence list from the presence server and processes and updates the presence list to determine whether a new super peer node is required in the network, wherein the super peer elector further uses information from the presence list to determine which simple peer nodes are available to perform super peer functions and elects one of the available simple peer nodes as a new super peer node using the most recently updated presence list to confirm availability.

14. The peer-to-peer network as claimed in claim 13, wherein the presence messages are received by the presence server using a Session Initiation (SIP) event notification framework.

15. The peer-to-peer network as claimed in claim 13, wherein the super peer elector determines the availability of a given simple peer node by subscribing to receive presence information notifications from the presence server, the most recently updated presence information notification being representative of the respective availabilities of all nodes within the network.

16. The peer-to-peer network as claimed in claim 13, wherein at least one of the simple peer nodes is a mobile telecommunications device.

17. The peer-to-peer network as claimed in claim 13, wherein the presence messages received from each device in the network include peer status information including at least one of:

peer bandwidth availability, peer storage capability and peer resource usage, and wherein the super peer elector determines which simple peer nodes are available to perform super peer functions by evaluating the peer status information for at least one simple peer node to determine whether the at least one simple peer node is capable of handling performance of super peer functions.

* * * * *